(12) United States Patent
Nakagawa et al.

(10) Patent No.: US 12,476,426 B2
(45) Date of Patent: Nov. 18, 2025

(54) TERMINAL BLOCK

(71) Applicant: Nissan Motor Co., Ltd., Yokohama (JP)

(72) Inventors: Takuya Nakagawa, Kanagawa (JP); Kohei Kasedo, Kanagawa (JP); Manato Itabashi, Kanagawa (JP); Yasuhiro Takeda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 378 days.

(21) Appl. No.: 17/999,942

(22) PCT Filed: May 29, 2020

(86) PCT No.: PCT/JP2020/021402
§ 371 (c)(1),
(2) Date: Nov. 28, 2022

(87) PCT Pub. No.: WO2021/240802
PCT Pub. Date: Dec. 2, 2021

(65) Prior Publication Data
US 2023/0238748 A1 Jul. 27, 2023

(51) Int. Cl.
*H01R 13/70* (2006.01)
*H01R 13/516* (2006.01)
*H01R 13/52* (2006.01)

(52) U.S. Cl.
CPC .......... *H01R 13/70* (2013.01); *H01R 13/516* (2013.01); *H01R 13/5205* (2013.01); *H01R 2201/26* (2013.01)

(58) Field of Classification Search
CPC .. H01R 13/70; H01R 13/516; H01R 13/5205; H01R 2201/26; H01M 50/572;
(Continued)

(56) References Cited

U.S. PATENT DOCUMENTS

2011/0244282 A1* 10/2011 Seto ............... H01M 50/227
429/82
2012/0057316 A1* 3/2012 Kaneshige .......... H01M 50/213
361/752

(Continued)

FOREIGN PATENT DOCUMENTS

JP 2002133979 A * 5/2002
JP 2012-85504 A 4/2012
(Continued)

*Primary Examiner* — Abdullah A Riyami
*Assistant Examiner* — Nader J Alhawamdeh
(74) *Attorney, Agent, or Firm* — GLOBAL IP COUNSELORS, LLP (57) ABSTRACT

A terminal block includes a casing, a terminal portion and an SD switch. The casing is provided to an electrical device. The terminal portion is provided on the casing and has a terminal cover that is fitted to a base for accommodating terminals. The SD switch is provided to the casing, and has a female connector and a lever portion that is fitted to the female connector to mechanical connect and disconnect from the electrical device. The lever portion constitutes an interlocking portion that restricts a disengaging operation of the terminal cover, when the lever portion is fitted to the female connector.

6 Claims, 9 Drawing Sheets

(58) Field of Classification Search
CPC .. H01M 50/574; H01M 50/59; H01M 50/249; Y02E 60/10
See application file for complete search history.

(56) References Cited

U.S. PATENT DOCUMENTS

| | | | | |
|---|---|---|---|---|
| 2014/0030563 | A1* | 1/2014 | Hoshi | B60L 3/0046 |
| | | | | 429/72 |
| 2015/0207130 | A1* | 7/2015 | Maguire | B60L 58/21 |
| | | | | 429/97 |
| 2023/0238748 | A1* | 7/2023 | Nakagawa | H01R 13/70 |
| | | | | 439/620.21 |

FOREIGN PATENT DOCUMENTS

| | | |
|---|---|---|
| JP | 2015-50034 A | 3/2015 |
| JP | 2017-123339 A | 7/2017 |
| JP | 2018-133269 A | 8/2018 |
| KR | 20120124188 A | 11/2012 |

* cited by examiner

TERMINAL BLOCK

CROSS-REFERENCE TO RELATED APPLICATIONS

This application is a U.S. national stage application of International Application No. PCT/JP2020/021402, filed on May 29, 2020.

BACKGROUND

Technical Field

The present invention relates to a terminal block.

Background Information

Japanese Patent Application No. 2018-133269 (Patent Document 1) discloses a terminal block mounted on a battery pack in which a plurality of battery cells (for example, storage batteries such as lithium ion secondary batteries and other non-aqueous electrolyte secondary batteries) are accommodated on an accommodating base.

SUMMARY

A terminal cover is removed when inspections, etc., have been performed in prior-art terminal blocks, including the terminal block disclosed in Patent Document 1. Therefore, the terminal cover is provided with a fitting detection device so that the terminal cover is not removed inattentively. In addition, there is a risk of electric shock when, e.g., the terminal block is attached to, a high-voltage battery pack, and is therefore equipped with a strong-current interruption device such as a service disconnect switch (SD switch), and a strong-current circuit can be mechanically disconnected using this switch.

However, although these devices provided to the terminal block function as an interlocking portion and are therefore needed to ensure worker safety, providing a plurality of detection functions presents the problem of complicating the mechanism and increasing the manufacturing cost.

At least one embodiment of the present invention has been devised in view of the circumstances described above, and it is an object of the present invention to specifically provide a terminal block with which the interlocking portion can be simplified while worker safety is ensured.

A terminal block according to one embodiment of the present invention comprises: a casing provided to an electrical device; a terminal portion having a terminal cover fitted on a base that is provided on the casing and that accommodates terminals; and an SD switch having a female connector provided on the casing, and a lever portion that is fitted in the female connector and that enables mechanical disconnection from the electrical device, the lever portion constituting an interlocking portion that, when fitted in the female connector, restricts an action of unfitting the terminal cover.

BRIEF DESCRIPTION OF THE DRAWINGS

Referring now to the attached drawings which form a part of this original disclosure.

DETAILED DESCRIPTION OF EMBODIMENTS

One mode for carrying out the invention is described in detail below with reference to the drawings. The embodiment presented herein is an example for embodying the technical idea of the present invention, and does not limit the present invention. Therefore, other modes, methods of use, operation techniques, etc., that can be carried out and conceived by those skilled in the art without departing from the scope of the present invention are all included in the scope and gist of the present invention, and are included in the scope of the invention set forth in the claims and equivalents of said invention.

In addition, in the drawings attached to the present specification, the scale, ratio of length and width, shape, etc., are in some cases changed from a realized article and represented schematically, as appropriate, for convenience of illustration and ease of understanding, but these drawings are merely examples and do not limit the interpretation of the present invention.

In the present specification, XYZ coordinates are set as shown in the drawings for convenience of explanation. Specifically, a "Z direction" is a direction along the vertical direction, an "X direction" is a direction orthogonal to the Z direction and parallel to the horizontal plane, and a "Y direction" is another direction orthogonal to the Z direction and parallel to the horizontal plane (a direction orthogonal to the X direction). Therefore, for example, in a terminal block 100 according to the present embodiment shown in FIG. 1, the Z direction is the same as a height (thickness) direction (up-down direction) of the terminal block 100, the X direction coincides with a transverse direction (width direction) of the terminal block 100, which is rectangular in plan view, and the Y direction coincides with a longitudinal direction (front-rear direction) of the terminal block 100.

The following description includes ordinal numerals such as "first" and "second," but these numerals are used for convenience and do not prescribe any particular order unless otherwise specified.

The terminal block 100 according to the present embodiment is used to relay internal wiring of various electrical devices and external wiring (a harness, etc.) from the outside. As an example, a case is described in which the terminal block 100 according to the present embodiment is used in a battery pack BP mounted in a vehicle such as a hybrid electric vehicle (HEV), in which an internal combustion engine and a battery-driven motor are combined as a travel drive source, or an electric vehicle (EV) that travels due to a battery-driven motor.

Figure 1:
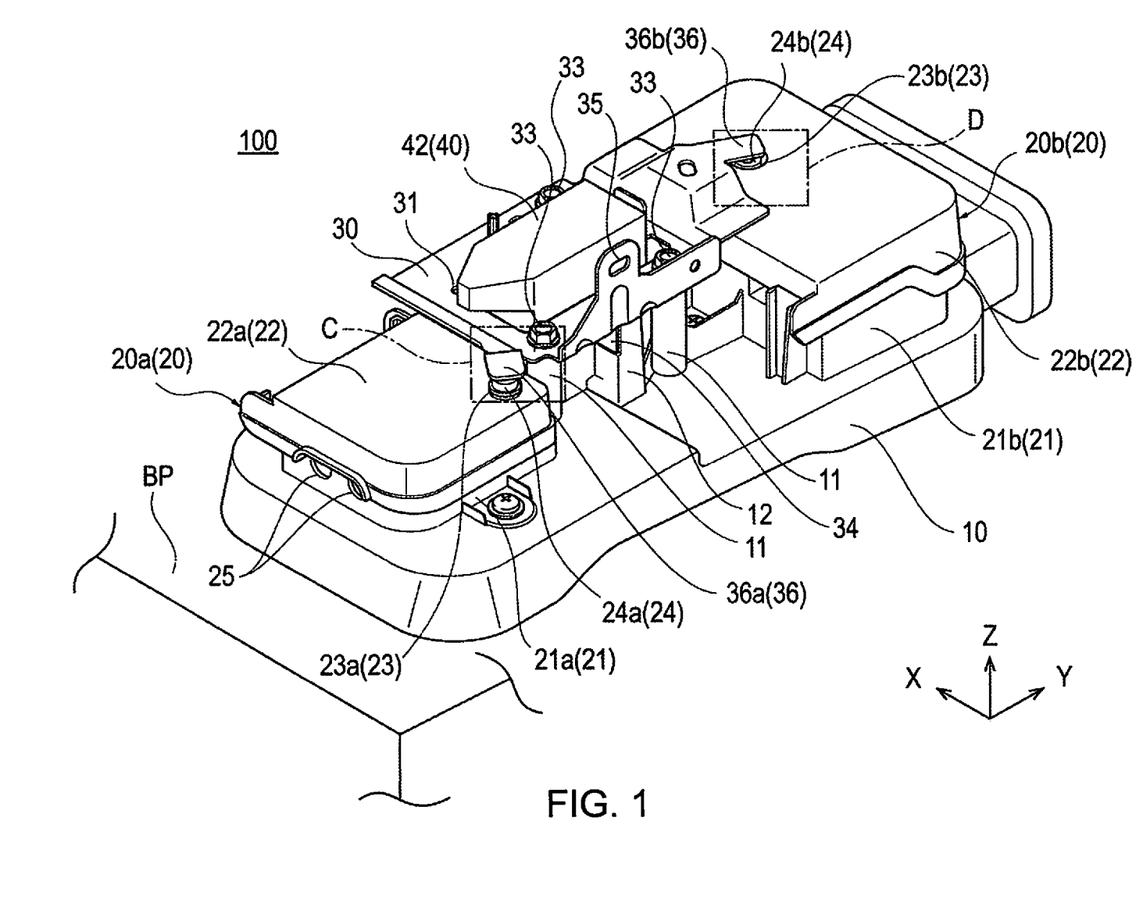
FIG. 1 is a drawing of a configuration of a terminal block according to the present embodiment.

The configuration of the terminal block 100 according to the present embodiment shall now be described. As shown in any of FIGS. 1 to 3, the terminal block 100 according to the present embodiment is installed in a predetermined location of the battery pack BP as shown in FIG. 1, the terminal block comprising a casing 10 and a terminal portions 20 constituted of a first terminal portion 20a and a second terminal portion 20b provided on the casing 10.

Figure 2:
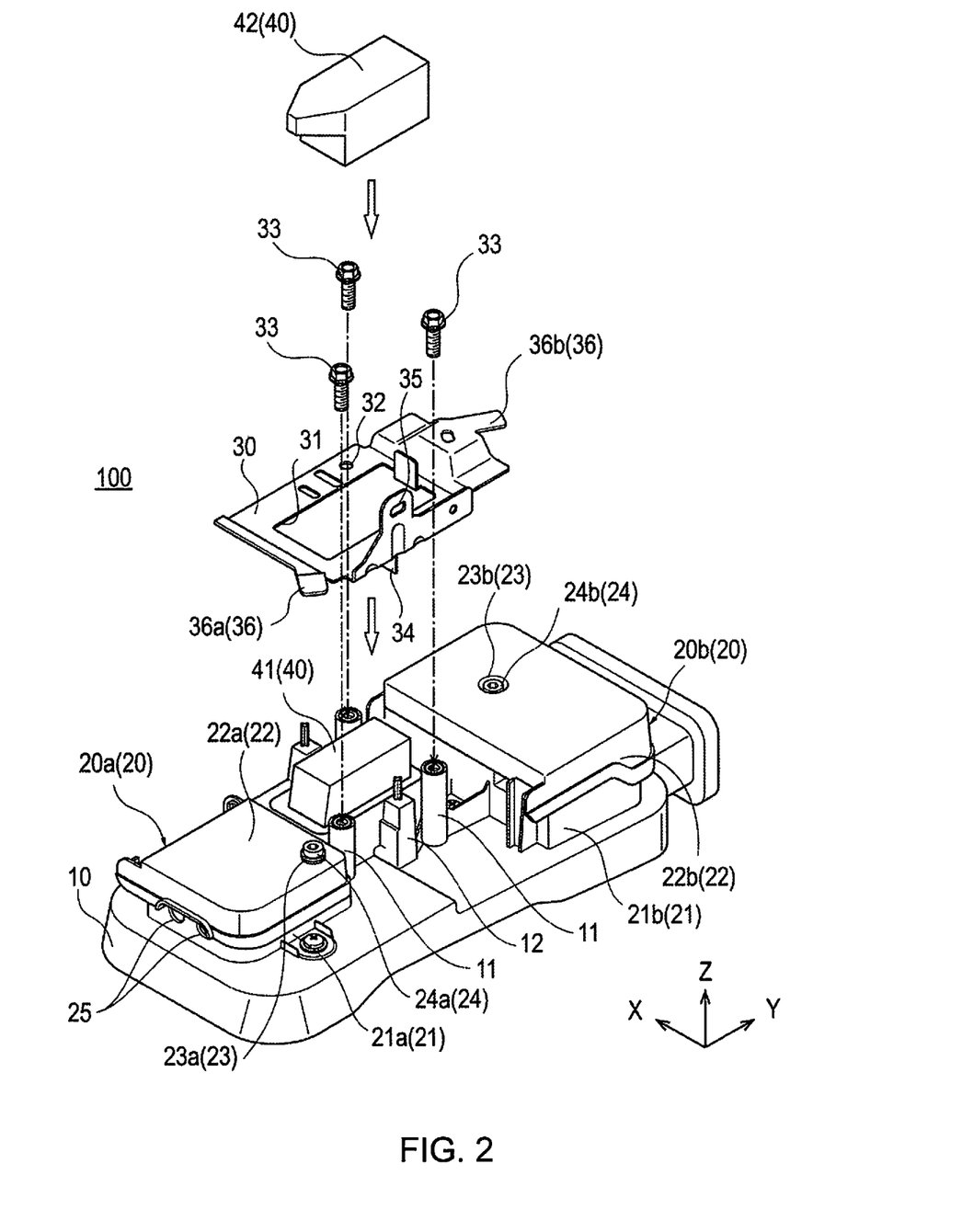
FIG. 2 is an exploded perspective view of the terminal block according to the present embodiment.
Figure 3:
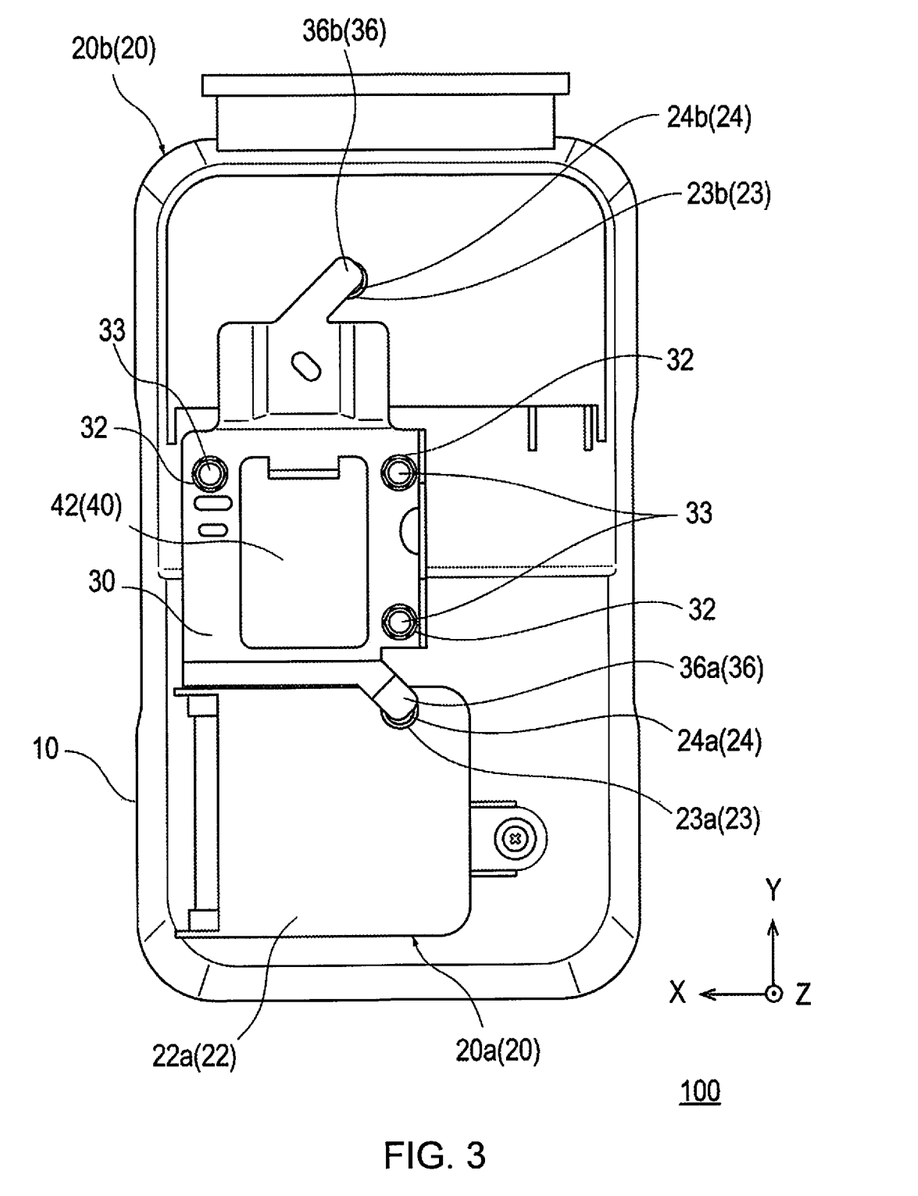
FIG. 3 is a plan view of the terminal block according to the present embodiment.

As an example, the casing 10 describes a substantially rectangular shape in plan view, and one or more terminal portions 20 are provided on the upper surface thereof. A bracket 30 is attached to a central portion of the casing 10 so as to overlap at least a portion of an upper surface of a terminal cover 22 provided on a base 21 for the terminal portions 20 so as to be openable and closable.

The bracket 30 is installed on the terminal cover 22, the reference being a positioning part (locator pin) 12 provided to the casing 10 for component attachment, and the bracket is securely fastened to an attachment part 11 of the casing 10. The bracket 30 shall be described in detail hereinafter.

The terminal portions 20 are provided with the openable and closable terminal cover 22, and are securely fastened to the base 21 by fixing screws 24 through attachment holes 23 drilled in an upper surface of the terminal cover 22. The terminal portions 20 include the first terminal portion 20a, which 3s provided on one-end side in the Y direction from the central portion of the casing 10, and the second terminal portion 20b, which is provided on the other-end side in the Y direction from the central portion of the casing 10. In the present embodiment, two terminal portions 20 are provided on the casing 10, but the number of terminal portions may be set as appropriate as long as there is at least one or more.

The first terminal portion 20a is provided with a plurality of terminals inside a first base 21a, and a terminal harness 200 (equivalent to a "wiring member" in the claims) that functions as a signal line or a power source line is connected to these terminals. One end of the terminal harness 200 is connected to the terminals and the other end is connected to an external electrical device (e.g., a travel motor to which power is supplied, an electronic control unit (ECU), etc.).

A first terminal cover 22a is openably and closably attached to one end of the first base 21a so as to cover an upper surface thereof. A first attachment hole 23a through which a first fixing screw 24a is inserted is drilled in a predetermined location in an upper surface of the first terminal cover 22a.

The first terminal cover 22a is fitted onto the first base 21a such that the interior of the first base 21a is covered, and is securely fastened in this state to the first base 21a using the fixing screw 24 (first fixing screw 24a) inserted into the first attachment hole 23a.

The second terminal portion 20b is provided with a plurality of terminals inside a second base 21b, and a terminal harness 200 is connected to these terminals, as with the first terminal portion 20a.

A second terminal cover 22b is openably and closably attached to one end of the second base 21b so as to cover an upper surface thereof. A second attachment hole 23b through which a second fixing screw 24b is inserted is drilled in a predetermined location in an upper surface of the second terminal cover 22b.

The second terminal cover 22b is fitted onto the second base 21b such that the interior of the second base 21b is covered, and is securely fastened in this state to the second base 21b using the fixing screw 24 (second fixing screw 24b) inserted into the second attachment hole 23b.

Due to the first terminal cover 22a and the second terminal cover 22b being securely fastened and attached, the terminal portion 20 is configured such that the terminals on the first base 21a and the terminals on the second base 21b cannot be accessed without removing the corresponding cover. Therefore, having the first terminal cover 22a and the second terminal cover 22b of the terminal portion 20 be in a fitted state (closed state) prevents electric shock to workers due to inattentive touching of the terminals of the first terminal portion 20a and the second terminal portion 20b, and ensures worker safety.

Figure 4A:
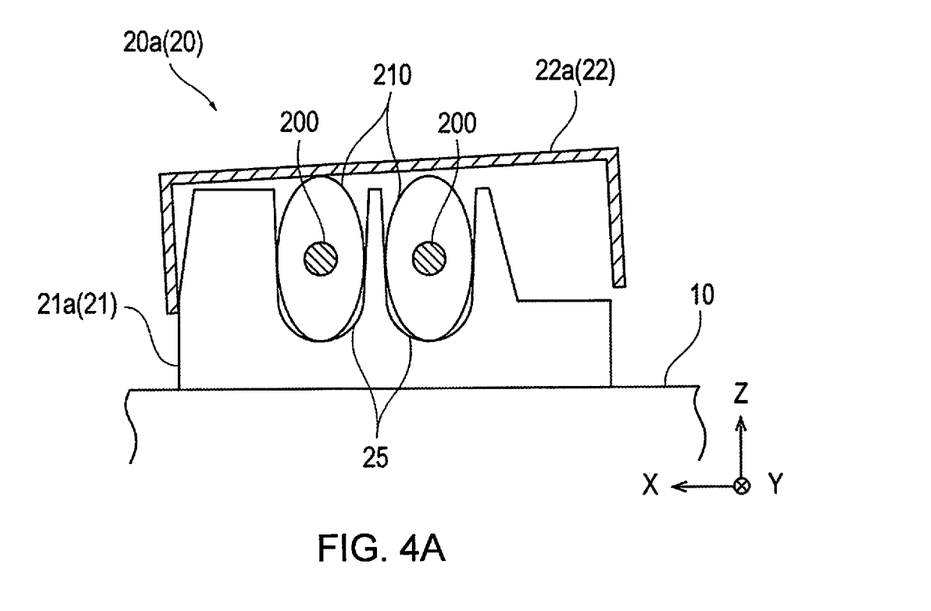
FIG. 4A is a side view of an open state of a first terminal cover in a first terminal portion according to the present embodiment.
Figure 4B:
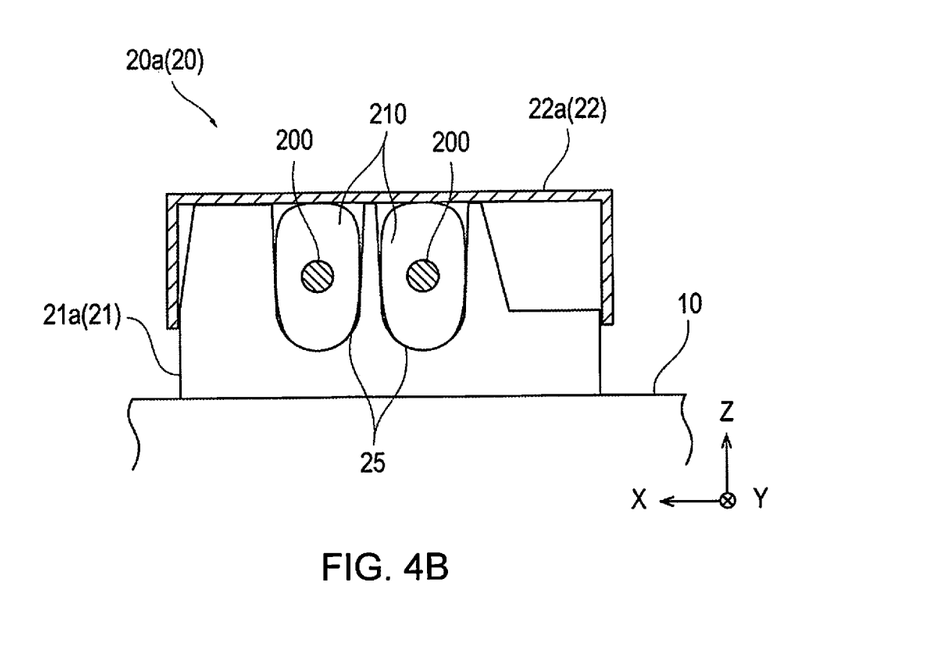
FIG. 4B is a side view of a state in which the first terminal cover of the first terminal portion according to the present embodiment has been fitted and securely fastened.

As shown in FIGS. 4A and 4B, the first base 21a and the second base 21b are provided with opening parts 25 through which the terminal harnesses 200 connected to the terminals are guided to the exterior.

As shown in FIG. 4A, the opening parts 25 have substantially U-shaped openings in one example, and the openings are designed to be smaller than the external size of the terminal harnesses 200, which each have a seal member 210 wound around at least part of the outer peripheral surfaces. This arrangement allows the seal member 210 to sufficiently exhibit a sealing function so as to prevent water from entering through the opening parts 25.

Because the opening parts 25 have such a structure, when the terminal harnesses 200 are guided out from the opening parts 25, the seal member 210 will protrude from the opening parts 25, and the first terminal cover 22a cannot be kept fitted on the first base 21a. However, the first terminal cover 22a is kept fitted on the first base 21a because the first terminal portion 20a according to the present embodiment is configured such that the terminal harnesses 200 are pulled out from the opening parts 25 and in this state the first terminal cover 22a is securely fastened using the first fixing screw 24a while remaining fitted on the first base 21a.

Thus, the first base 21a has a structure such that the first terminal cover 22a is not easily fitted thereon when the terminal harnesses 200 protrude from the opening parts 25, and must be securely fastened using the first fixing screw 24a in order to fit the first terminal cover 22a on the first base. Therefore, the terminal block 100 according to the present embodiment can prevent a worker from forgetting to fasten the first terminal cover 22a using the first fixing screw 24a. Similarly, with the second terminal portion 20b, a worker can also be prevented from forgetting to fasten the second terminal cover 22b using the second fixing screw 24b.

The bracket 30 is a member that is installed overlapping the upper surfaces of the first terminal cover 22a and the second terminal cover 22b in a height direction of the terminal block 100, and is installed below a lever portion 42. The bracket 30 is attached to the casing 10 in a state of having been installed so as to overlap at least part of the upper surfaces of the first terminal cover 22a and the second terminal cover 22b.

The bracket 30 has an insertion hole 31 through which a female connector 41 of an SD switch 40 is inserted when the bracket is attached to the casing 10, and an attachment hole 32 drilled in alignment with the position of the attachment part 11 on the casing 10.

The bracket 30 is put into a temporarily attached state in which the female connector 41 is inserted through the insertion hole 31 using the positioning part 12 as a reference, and the female connector 41 is caused to protrude from the insertion hole 31. The temporarily attached bracket 30 is fastenably fitted to the casing 10 by inserting an attachment screw 33 into the attachment hole 32 and screwing the bracket to the attachment part 11.

The opening dimension of the insertion hole 31 in the bracket 30 is set smaller than the external size of the lever portion 42. As a result, at least part of the bracket 30 overlaps, in the Z direction (up-down direction), at least part of the lever portion 42 installed over the bracket 30 when the bracket has been securely fastened to the casing 10. Therefore, the bracket 30 is of such a structure as to be impossible to remove without removing the lever portion 42.

A lower surface of the bracket 30 is provided with a regulating member 34 that comes into contact with part of the casing 10 (e.g., the positioning part 12) to regulate an angle of inclination relative to the upper surfaces of the first terminal cover 22a and the second terminal cover 22b from an attachment orientation relative to the casing 10. The term "attachment orientation" means an orientation of the bracket 30 when securely fastened and attached to the casing 10, this orientation being substantially parallel to the upper surfaces of the first terminal cover 22a and the second terminal cover 22b.

Figure 5A:
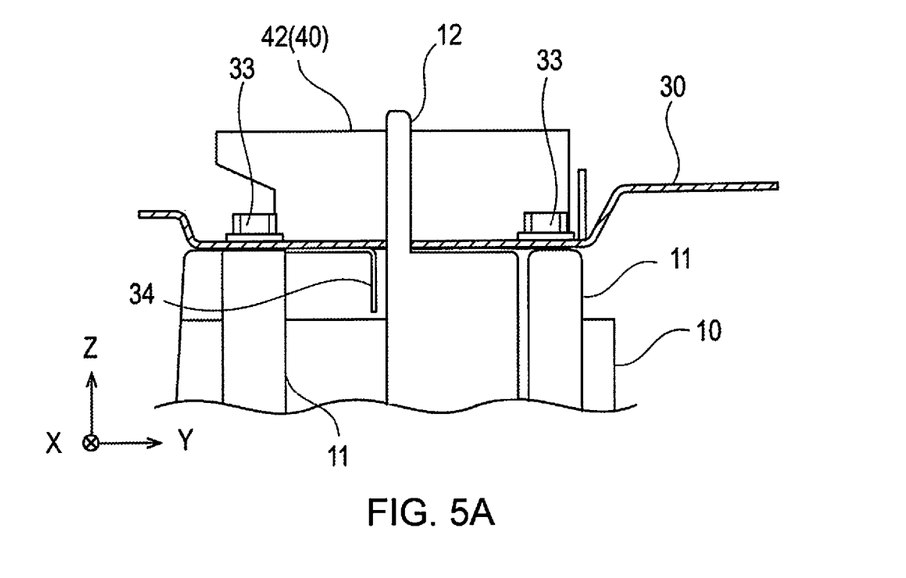
FIG. 5A is a partial cross-sectional view of a state in which a bracket according to the present embodiment has been attached to a casing.
Figure 5B:
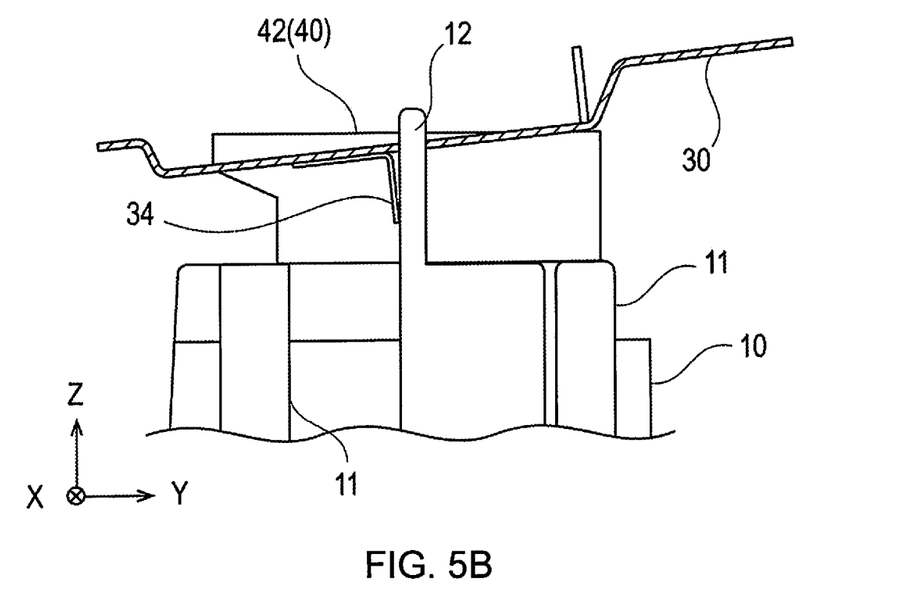
FIG. 5B is a partial cross-sectional view of a state in which the bracket according to the present embodiment has been tilted and a regulating member brought into contact with part of a base.

As shown in FIG. 5A, when the bracket 30 has been attached and securely fastened to the casing 10, the orientation of the bracket 30 is substantially horizontal, and the regulating member 34 and the positioning part 12 are not in contact, but there is a slight gap therebetween. As shown in FIG. 5B, even if the bracket 30 is unfastened so as to be removed with the lever portion 42 attached, the regulating member 34 comes into contact with a side surface of the positioning part 12, which is part of the casing 10, and the angle of inclination of the bracket relative to the upper surfaces of the first terminal cover 22a and the second terminal cover 22b is regulated.

In the terminal block 100 according to the present embodiment, because the opening dimension of the insertion hole 31 of the bracket 30 is set smaller than the external size of the lever portion 42, the lever portion 42 does not pass through the insertion hole 31 if the terminal block has been created according to established product dimensions. However, depending on the degree of variation in the product dimensions, the opening size of the insertion hole 31 could be approximately equal to the external size of the lever portion 42, and the bracket 30 could be tilted or otherwise forcibly removed from the terminal block 100.

As a measure to prevent erroneous removal in the event of such variations in product dimensions, the present embodiment is configured such that the regulating member 34 is provided to the bracket 30, and the angle of inclination relative to the upper surfaces of the first terminal cover 22a and the second terminal cover 22b is regulated so that part of the lever portion 42 will necessarily be brought into contact with a part near the insertion hole 31, making it impossible to remove the bracket. Therefore, the worker can undo the fitted state of the first terminal cover 22a and the second terminal cover 22b only according to the correct process, and can prevent process mistakes.

Figure 6A:
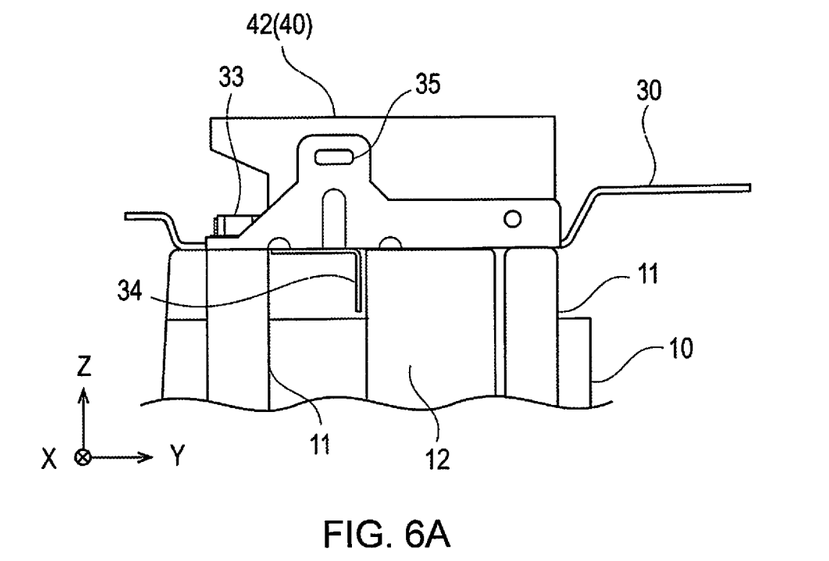
FIG. 6A is a side view of the proximity of an attachment part of the bracket according to the present embodiment.
Figure 6B:
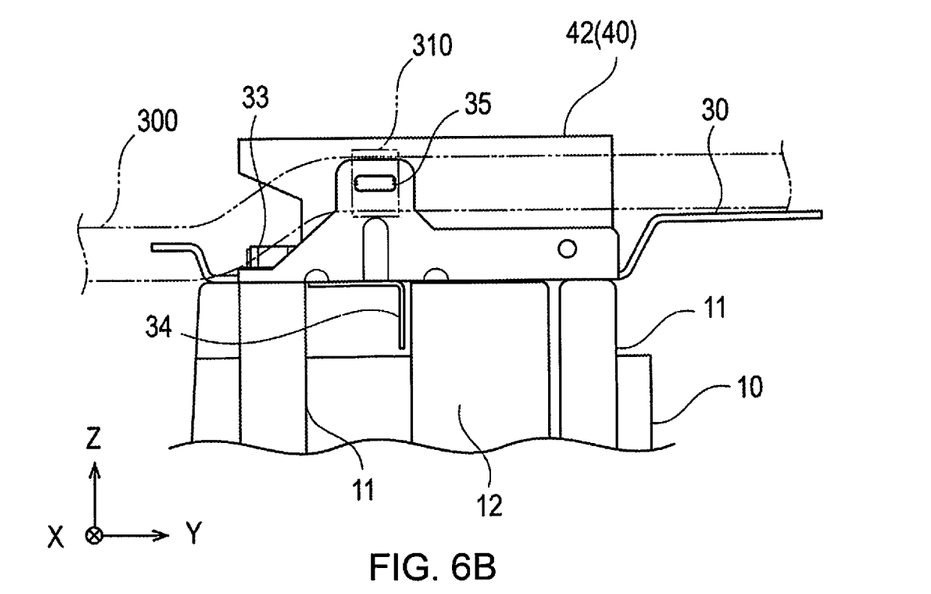
FIG. 6B is a side view of a state in which a wiring member has been attached to the attachment part of the bracket according to the present embodiment.

As shown in FIG. 6A or 6B, the bracket 30 is provided with an attachment securing part 35 for attaching a wiring member (vehicle harness 300, etc.) other than the terminal harnesses 200 wired to an electrical device (travel motor, etc.) other than the battery pack BP on which the terminal block 100 is installed. In FIG. 6A, the attachment securing part 35 according to the present embodiment is an attachment hole formed in a portion where an end part of the bracket 30 is bent and erected.

As shown in FIG. 6B, a securing member 310 provided to a vehicle harness 300 routed near the terminal block 100 is attached to the attachment securing part 35. In the present embodiment, the vehicle harness 300 to be attached to the attachment securing part 35 is a member attached and secured to the attachment securing part 35, and in the process of manufacturing the vehicle, the assembly work cannot be completed unless the vehicle harness is attached to a predetermined attachment position. Therefore, if the vehicle harness 300 cannot be attached to the attachment securing part 35, the worker cannot finish the assembly work and can naturally notice that the bracket 30 has been left unattached.

The bracket 30 has cover parts 36 including a first cover part 36a provided so as to overlap at least part of a head of the first fixing screw 24a that secures the first terminal cover 22a and a second cover part 36b provided so as to overlap at least part of a head of the second fixing screw 24b that secures the second terminal cover 22b when the bracket 30 has been attached to the casing 10. The cover parts 36 are portions for inhibiting access to the first fixing screw 24a and the second fixing screw 24b with a fastening tool when the bracket 30 has been attached to the casing 10.

Figure 7A:
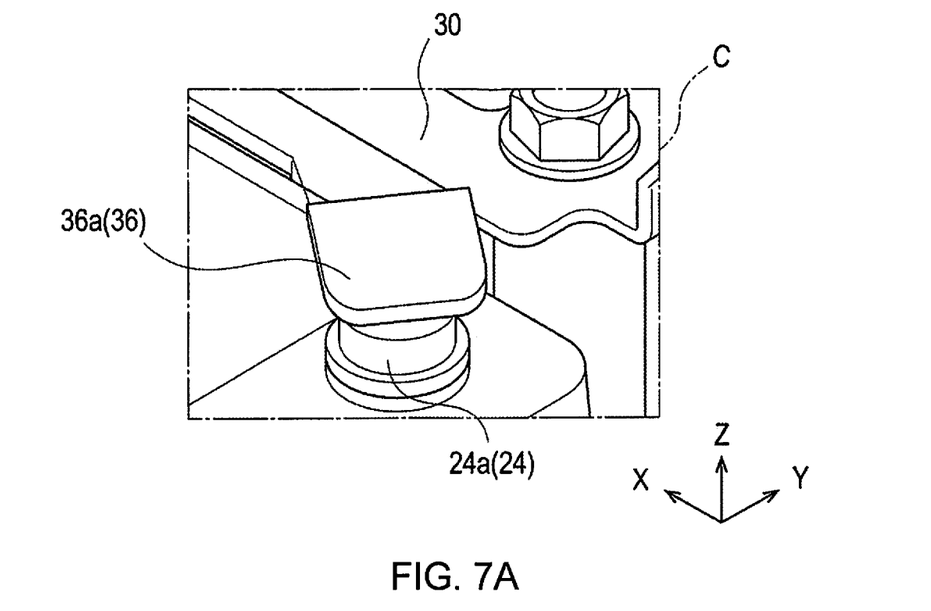
FIG. 7A is a schematic perspective view of an enlargement of area C of FIG. 1.
Figure 7B:
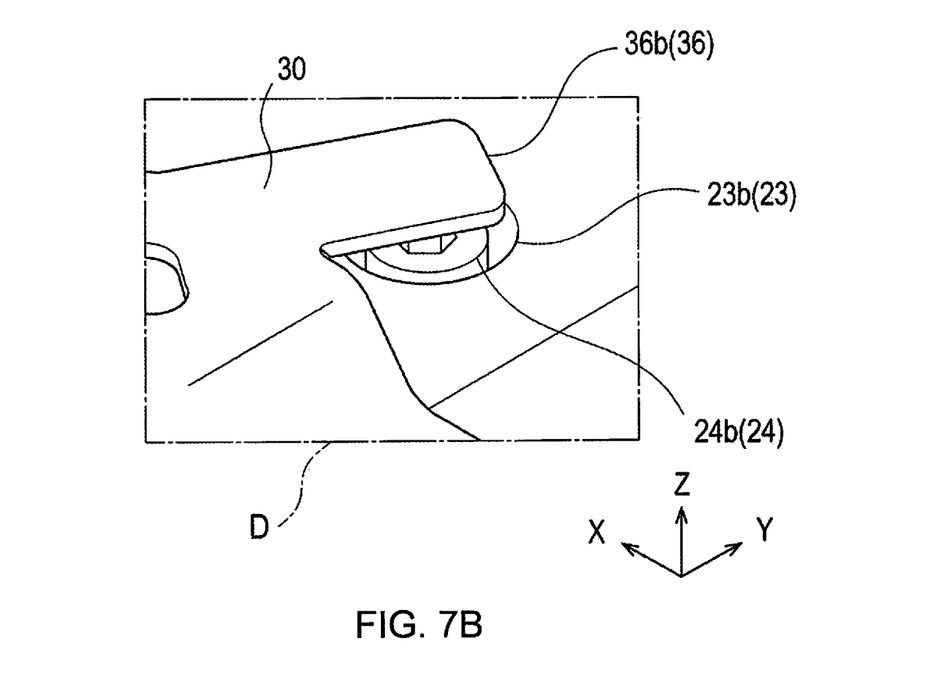
FIG. 7B is a schematic perspective view of an enlargement of area D of FIG. 1.

FIG. 7A shows a partial enlarged view of area C in FIG. 1, and FIG. 7B shows a partial enlarged view of area D in FIG. 1. As shown in FIG. 7A, the first cover part 36a is provided to the bracket 30 such that at least part of the head of the first fixing screw 24a is covered when the bracket 30 has been attached to the casing 10.

Although the first cover part 36a is provided such that at least part of the head of the first fixing screw 24a is covered, from the viewpoint of effectively inhibiting access to the first fixing screw 24a with a fastening tool, the first cover part is preferably provided so as to cover at least part of a tool hole provided in the head of the first fixing screw 24a, and more preferably provided so as to cover the entire head of the first fixing screw 24a.

As shown in FIG. 7B, the second cover part 36b is provided to the bracket 30 such that at least part of the head of the second fixing screw 24b is covered when the bracket 30 has been attached to the casing 10.

Although the second cover part 36b is provided such that at least part of the head of the second fixing screw 24b is covered, from the viewpoint of effectively inhibiting access to the second fixing screw 24b with a fastening tool, the second cover part is preferably provided so as to cover at least part of a tool hole provided in the head of the second fixing screw 24b, and more preferably provided so as to cover the entire head of the second fixing screw 24b.

Thus, when the bracket 30 has been attached, fastening tools cannot be properly engaged in the tool holes of the first fixing screw 24a and the second fixing screw 24b even when an attempt is made to remove the first fixing screw 24a and the second fixing screw 24b. Therefore, unnecessary removal of the first terminal cover 22a and the second terminal cover 22b can be prevented.

As described above, in the terminal block 100 according to the present embodiment, the bracket 30 is a member that must be removed in order to undo the fitted state of the first terminal cover 22a and the second terminal cover 22b, and together with the lever portion 42 of the SD switch 40, the bracket functions as a portion that interlocks the first terminal portion 20a and the second terminal portion 20b. In addition, because the bracket 30 is attached in a state of contact with the upper surface of the first terminal cover 22a and the upper surface of the second terminal cover 22b, it is also possible to obtain the effect of preventing rattling due to displacement of the covers.

The SD switch 40 is a service disconnect switch (strong current cutoff switch) that functions as a terminal member for cutting off a power source circuit for the purpose of inspection and maintenance of the terminal block 100. The SD switch 40 includes the female connector 41, which is provided to the upper surface of the casing 10, and the lever portion 42, which is attached to the female connector 41 by being pressed in a direction toward the female connector 41 (downward).

The SD switch 40 is a mechanical switch that functions as an interlocking portion that cuts off the electrical connection between an electrical device and the terminal block 100 by manual operation. The SD switch 40 can be mechanically connected/disconnected to/from an electrical device to be connected. The SD switch is electrically connected to the battery pack BP when the lever portion 42 is attached to the female connector 41 resulting in the fitted state, and the electrical connection with the battery pack BP is cut off when the lever portion 42 is detached from the female connector The external size of the lever portion 42 is set larger than the opening dimension of the insertion hole 31 of the bracket 30. When the lever portion 42 is attached to the female connector 41 with the bracket 30 having been attached, at least part of the lever portion 42 overlaps part of the bracket 30 in the X direction.

In the terminal block 100 according to the present embodiment, the lever portion 42 is a member that is removed first in order to remove the bracket 30, and is configured such that at least part of the lever portion 42 interferes with the upper surface of the bracket 30 and cannot be removed even if an attempt is made to remove the bracket 30 with the lever portion 42 attached.

Therefore, even if the worker makes a mistake in procedure, it is possible to prevent the worker from electric shock due to carelessly accessing the inside of the first terminal portion 20a and the second terminal portion 20b, because the first terminal cover 22a and the second terminal cover 22b cannot be removed.

As described above, the terminal block 100 according to the present embodiment is configured such that the bracket 30 cannot be removed without removing the lever portion 42, and the fitted state of the first terminal cover 22a of the first terminal portion 20a and the second terminal cover 22b of the second terminal portion 20b cannot be undone without removing the bracket 30.

Specifically, in the terminal harnesses 200 according to the present embodiment, the bracket 30 and the SD switch 40 having the lever portion 42 function as an interlocking portion that restrict one action (an action of unfitting the first terminal cover 22a and the second terminal cover 22b) in accordance with another state (the attached state of the bracket 30 and the lever portion 42). The SD switch 40 also functions as an interlocking portion that mechanically disconnects the electrical connection of the terminal block 100 due to a predetermined operation, such as removing the lever portion 42, to inspect the terminal block 100. Therefore, in the terminal block 100 according to the present embodiment, the configuration of the interlocking portion can be simplified while ensuring the safety of the worker.

Figure 8A:
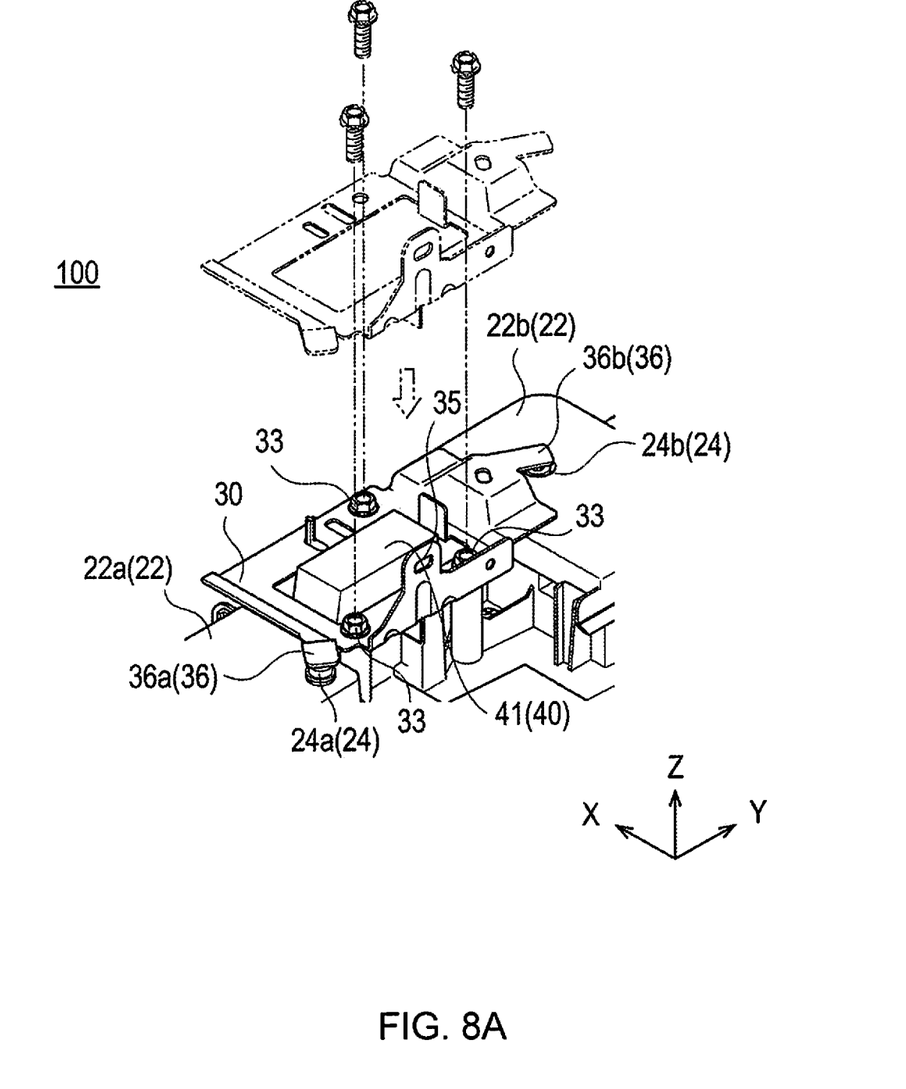
FIG. 8A is an exploded perspective view of the state of an action of unfitting or fitting terminal portions according to the present embodiment.

Next, the actions of the terminal block 100 according to the present embodiment shall be described with reference to FIGS. 8A and 8B. Descriptions shall be given of a "fitting action," in which the terminal cover 22 is put into a fitted state, and an "unfitting action," which is a series of actions performed when disestablishing the fitted state of the terminal cover 22.

An action of establishing the first terminal cover 22a and the second terminal cover 22b in a fitted state shall now be described. First, as a fitting procedure 1, the first terminal cover 22a is securely fastened by the first fixing screw 24a in a state of having been fitted to the first base 21a, as shown in FIG. 8A. In addition, the second terminal cover 22b is securely fastened by the second fixing screw 24b in a state of having been fitted to the second base 21b.

Next, as a fitting procedure 2, the bracket 30 is temporarily attached and securely fastened to the casing 10 by the attachment screw 33. After the bracket 30 has been attached, the securing member 310 of the vehicle harness 300 is attached to the attachment securing part 35. As a result, the bracket 30 causes the terminal portions 20 to assume an interlocked state in which the head of the first fixing screw 24a is covered by the first cover part 36a, and the head of the second fixing screw 24b is covered by the second cover part 36b so as to restrict the action of unfitting the first terminal cover 22a and the second terminal cover 22b.

Figure 8B:
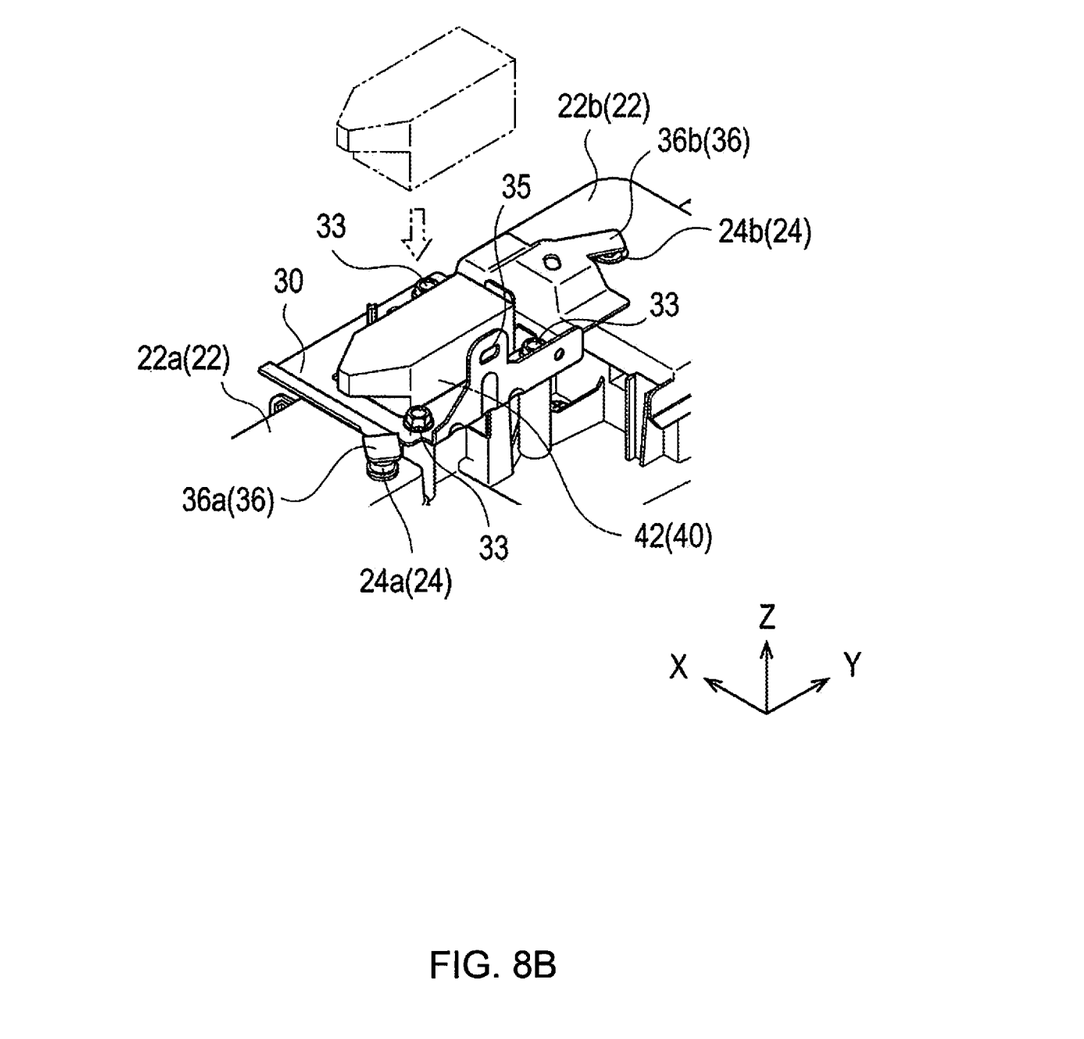
FIG. 8B is an exploded perspective view of the state of an action of unfitting or fitting terminal portions according to the present embodiment.

Then, as a fitting procedure 3, the lever portion 42 is attached to the female connector 41 as shown in FIG. 8B. As a result, the terminal portions 20 assume an interlocked state in which the action of removing the bracket 30 is restricted by the fitted state of the lever portion 42.

The terminal block 100 is also electrically connected to the battery pack BP due to the lever portion 42 of the SD switch 40 being in the attached state.

Next, the action of unfitting the first terminal cover 22a and the second terminal cover 22b shall be described. The unfitting action is performed when inspecting the terminal block 100, and is the reverse of the fitting action described above. Specifically, first, the lever portion 42 of the SD switch 40 is removed as an unfitting procedure 1. This releases the bracket 30 from being interlocked by the lever portion 42.

Next, as an unfitting procedure 2, the attachment screw 33 is removed to unfasten the bracket 30 from the casing 10, and the bracket 30 is removed. In addition, when the bracket 30 is removed, the securing member 310 of the vehicle harness 300 is removed from the attachment securing part 35. This terminal portions 20 are thereby released from being interlocked by the bracket 30.

Then, as an unfitting procedure 3, the first fixing screw 24a of the first terminal portion 20a is removed to unfit the first terminal cover 22a, and the second fixing screw 24b of the second terminal portion 20b is removed to unfit the second terminal cover 22b. This makes it possible to access the terminals of the first terminal portion 20a and the terminals of the second terminal portion 20b.

With the first terminal cover 22a and the second terminal cover 22b having been unfitted, the lever portion 42 of the SD switch 40 is removed; therefore, the electrical connection of the terminal block 100 to the battery pack BP is cut off, and the terminal block can be safely inspected.

As described above, the terminal block 100 according to the present embodiment comprises a casing 10 provided to a battery pack BP serving as an electrical device, a first terminal portion 20a and second terminal portion 20b that are provided on the casing 10 and that have a first terminal cover 22a and second terminal cover 22b fitted on a first base 21a and second base 21b that accommodate terminals, and an SD switch 40 having a female connector 41 provided on the casing 10 and a lever portion 42 fitted to the female connector 41 and used to mechanically disconnect the terminal block from the battery pack BP, the lever portion 42 constituting an interlocking portion that restricts the action of unfitting the first terminal cover 22a and the second terminal cover 22b when the lever portion has been fitted to the female connector 41.

By adopting such a configuration, the fitted state of the first terminal cover 22a of the first terminal portion 20a and the second terminal cover 22b of the second terminal portion 20b cannot be released without removing the lever portion 42. Specifically, because the lever portion 42 functions as an interlocking portion that restricts the action of unfitting the first terminal cover 22a and the second terminal cover 22b in accordance with the attached state, there is no need to provide an interlocking mechanism dedicated for the terminal portions 20 separate from the SD switch 40, as in the prior art, and the interlocking portion can be simplified while ensuring the safety of the worker. In addition, even if the terminal block 100 is provided in a high-voltage electrical device such as the battery pack BP, the safety of the worker is sufficiently ensured because of the function to disconnect the terminal block from a strong-current circuit using the SD switch.

In the terminal block 100 according to the present embodiment, it is also preferable that the interlocking portion includes a bracket 30 having an insertion hole 31 through which the female connector 41 is inserted when the bracket is attached to the casing 10 in a state of being placed over the first terminal cover 22a and the second terminal cover 22b so as to overlap at least part of the first terminal cover 22a and the second terminal cover 22b, and the opening dimension of the insertion hole 31 may be set smaller than the outer shape of the lever portion 42 so as to overlap at least part of the lever portion 42.

By adopting such a configuration, the bracket 30 cannot be removed without removing the lever portion 42, and the fitted state of the first terminal cover 22a of the first terminal portion 20a and the second terminal cover 22b of the second terminal portion 20b cannot be undone without removing the bracket 30. Specifically, because the bracket 30 functions as an interlocking portion that restricts the action of unfitting the first terminal cover 22a and the second terminal cover 22b in accordance with the attached state, there is no need to provide an interlocking mechanism dedicated for the terminal portions 20 separate from the SD switch 40, as in the prior art, and the interlocking portion can be simplified while ensuring the safety of the worker.

The terminal block 100 according to the present embodiment is also preferably configured such that the bracket 30 has a regulating member 34 that regulates an angle of inclination relative to the upper surfaces of the first terminal cover 22a and the second terminal cover 22b from an attachment orientation relative to the casing 10.

By adopting such a configuration, even if the opening size of the insertion hole 31 is approximately equal to the external size of the lever portion 42 depending on the degree of variation in the product dimensions, the angle of inclination relative to the upper surfaces of the first terminal cover 22a and the second terminal cover 22b is regulated, and part of the lever portion 42 will always come into contact with a part near the insertion hole 31, making it impossible to remove the bracket. Therefore, the worker can undo the fitted state of the first terminal cover 22a and the second terminal cover 22b only according to the correct process, and can prevent process mistakes.

The terminal block 100 according to the present embodiment is preferably configured such that the bracket 30 is provided with a first cover part 36a and a second cover part 36b, which overlap at least part of the heads of a first fixing screw 24a and a second fixing screw 24b, which securely fasten the first terminal cover 22a and the second terminal cover 22b to the casing 10.

By adopting such a configuration, when the bracket 30 has been attached, fastening tools cannot be properly engaged in tool holes in the first fixing screw 24a and the second fixing screw 24b even if an attempt is made to unfasten the first fixing screw 24a and the second fixing screw 24b, and unnecessary removal of the first terminal cover 22a and the second terminal cover 22b can be prevented.

The terminal block 100 according to the present embodiment is preferably configured such that the bracket 30 has an attachment securing part 35 for attaching the securing member 310 of another wiring member such as the vehicle harness 300, which is wired to a connection object (such as a travel motor) other than the battery pack BP.

The assembly work cannot be completed if a member attached and secured to the attachment securing part 35, such as the vehicle harness 300, has not been attached in a predetermined attachment position. Therefore, if the vehicle harness 300 cannot be attached to the attachment securing part 35, the worker cannot complete the assembly work and can notice that the bracket 30 has been left unattached.

The terminal block 100 according to the present embodiment is also preferably configured such that the first base 21a and the second base 21b have opening parts 25 for guiding terminal harnesses 200, which are wiring members connected to terminals, to the outside, and the terminal harnesses 200 connected to terminals are provided with elastic seal member 210 in at least part of the outer peripheral surfaces and are larger in outer shape than the opening parts 25.

By adopting such a configuration, for example, the first base 21a has a structure that makes it difficult for the first terminal cover 22a to be fitted with the terminal harness 200 connected, and the worker can be prevented from forgetting to fasten the first terminal cover 22a using the first fixing screw 24a.

The invention claimed is:

1. A terminal block comprising:
a casing provided to an electrical device;
a terminal portion provided on the casing and having a terminal cover that is fitted to a base for accommodating terminals; and
an SD switch provided to the casing, and having a female connector and a lever portion that is fitted to the female connector to mechanical connect and disconnect from the electrical device,
the lever portion constituting an interlocking portion that restricts a disengaging operation of the terminal cover, when the lever portion is fitted to the female connector,
the interlocking portion including a bracket having an insertion hole through which the female connector is inserted when the bracket is attached to the casing in a state of being installed over the first terminal cover so as to overlap at least part of the first terminal cover, and
the insertion hole having an opening dimension that is set smaller than an outer shape of the lever portion so that the bracket overlaps at least part of the lever portion.

2. The terminal block according to claim 1, wherein
the bracket includes a regulating member that regulates an angle of inclination relative to an upper surface of the terminal cover from an attachment orientation relative to the casing.

3. The terminal block according to claim 1, wherein
the bracket is provided with a cover part that overlaps at least part of a head of a fixing screw, which securely fastens the terminal cover to the casing.

4. The terminal block according to claim 1, wherein
the bracket includes an attachment securing part for attaching a securing member of another wiring member wired to a connection object other than the electrical device.

5. The terminal block according to claim 1, wherein
the base has an opening part for guiding a wiring member connected to the terminals to outside, and
the wiring member connected to the terminals is provided with an elastic seal member on at least part of an outer peripheral surface, and is set so as to be larger in an outer shape than the opening part.

6. The terminal block according to claim 1, wherein
the electrical device is a battery pack that supplies electric power at least to a motor that drives a vehicle.

* * * * *